United States Patent [19]
Rose

[11] Patent Number: 4,887,171
[45] Date of Patent: Dec. 12, 1989

[54] SLANT RECORD/HELICAL SCAN PLAYBACK CERTIFIER

[75] Inventor: James B. Rose, Sachse, Tex.

[73] Assignee: E-Systems, Inc., Dallas, Tex.

[21] Appl. No.: 177,369

[22] Filed: Apr. 4, 1988

[51] Int. Cl.$^4$ ....................... G11B 27/36; G11B 15/14
[52] U.S. Cl. .......................................... 360/31; 360/64
[58] Field of Search ....................... 360/31, 62, 64, 54; 324/212, 213

[56] References Cited

U.S. PATENT DOCUMENTS

| | | | |
|---|---|---|---|
| 3,404,223 | 10/1968 | La Violette | 178/6.6 |
| 3,873,975 | 3/1975 | Miklos et al. | 340/149 |
| 3,947,875 | 3/1976 | Bull et al. | 360/39 |
| 4,255,807 | 3/1981 | Cosby | 371/21 |
| 4,263,625 | 4/1981 | Warren | 360/31 |
| 4,323,844 | 4/1982 | Mikame | 324/212 |
| 4,480,274 | 10/1984 | Coleman, Jr. | 360/31 |
| 4,772,963 | 9/1988 | Van Lahr et al. | 360/53 |

Primary Examiner—Vincent P. Canney
Attorney, Agent, or Firm—Albert M. Crowder, Jr.

[57] ABSTRACT

A slant record/helical scan playback certifier for high speed magnetic tape certification including a signal generator for producing test data, a slant record head for recording the test data onto magnetic tape, a plurality of helical scan playback head for reproducing and transmitting the test data recorded in the magnetic tape, an error detector and error counter for detecting and counting the test data errors found on the magnetic tape and an error collection reporting system for collecting and reporting the test data errors found in the magnetic tape. Further disclosed are a preamplifier and an amplifier for amplification of the test data transmitted by the helical scan playback head.

6 Claims, 1 Drawing Sheet

4,887,171

SLANT RECORD/HELICAL SCAN PLAYBACK CERTIFIER

TECHNICAL FIELD

This invention relates to apparatus for high speed magnetic tape certification, and more particularly, to apparatus for slant record/helical scan playback certification.

BACKGROUND OF THE INVENTION

Presently under development is the use of magnetic tape as the recording media for digital cassette recording for use in the electrical component and computer industries. Digital cassette recording requires vast amounts of magnetic tape. As such, reliable and efficient apparatus for certification of production magnetic tape is necessary to ensure the required quality and quantity of tape.

A magnetic tape cassette for digital recording consists of a plastic cartridge with concentric supply and take-up reels, with approximately 1000 ft. of magnetic tape per cassette, having a capacity for approximately 930 ft. of tape for recorded data.

Digital cassette recorders utilize a helical scan technique for recording wideband data and a longitudinal recording technique to record positioning data onto the magnetic tape. The wideband data is serially recorded on the magnetic tape at a 14° angle to the edge of the tape and has a packing density of 45 Kbits per inch. Spacing between adjacent scans is approximately 0.03 millimeters, thus, a small tape defect can introduce large unacceptable data errors that require costly and time consuming correction.

Additionally, since digital cassette recording "writes" data at an angle to the tape edge, it is much more sensitive to longitudinal scratches which do not normally effect longitudinal recording.

Heretofore, there have been three basic concepts in use for certification of magnetic tape. These include laser scanning, helical scan record/playback and longitudinal record/playback Each are briefly discussed below.

Laser scanning consists of using a laser to scan the tape for tape defects. It is a useful quality control tool for analyzing tape surface and edge conditions. Laser scanning does not provide, however, any information about the magnetic characteristics of the tape, or the performance of the tape when used in a digital cassette recorder.

The helical scan record/playback certifier utilizes the helical scan approach for the recording of test data and reproduction of the same data to verify tape quality. It provides an excellent test in an environment very similar to a digital cassette recorder configuration. One disadvantage of the helical scan record/playback certifier is that two tape passes are required (record followed by playback), which is very time consuming. Additionally, the certifier must track very accurately, otherwise, any mistracking would be interpreted as a tape defect.

The longitudinal record/playback certifier uses a standard longitudinal transport to record and reproduce data. This can be done at high speeds, approximately 100 inches per second, with a single tape pass (read after write operation), thus, yielding a high output for tape certification. This method, however, not only does not detect, but can cause longitudinal irregularities, such as scratches. The improved signal to noise ratio from the wider track widths of a longitudinal system can also mask certain tape problems.

SUMMARY OF THE INVENTION

The present invention, the slant record/helical scan playback certifier, incorporates the advantages of the helical scan record/playback certifier and the longitudinal record/playback certifier by using a single track longitudinal slant head to record data on the tape and helical scan playback heads to reproduce the data while monitoring signal dropouts.

This provides an efficient, yet accurate analysis of the magnetic tape for use in a digital cassette recorder.

Additionally, the single pass certification process minimizes tracking requirements of the helical scan head and reduces the scanner head to tape contact, thus, reducing head maintenance.

The slant record/helical scan playback certifier consists of a longitudinal record head mounted with its effective gap line parallel to the effective helical scan playback head gap line. The gap lines are gaps in the magnetic field of the record heads and control the orientation of the magnetic field (Azimuth) and, thus, the recording. In order to have a "read" after "write" single pass operation the effective gap lines (Azimuth) must be in a parallel alignment.

The slant record head of the present invention is capable of recording data on the entire width of the tape and not just on the individual scan lines eliminating the need for critical tracking The helical playback scanner is placed after the slant record head in the tape path, thus providing single pass operation (read after write). The auxiliary and control tracks can be recorded and monitored in the same pass. This allows high volume tape testing at a high speed that is similar to a digital cassette recorder configuration. It will not damage the edge of the tape or leave a footprint in the tape incompatible with the configuration of the digital cassette recorder Thus, the present invention is an improvement in both speed and accuracy in magnetic tape certification for use in digital cassette recorders.

BRIEF DESCRIPTION

A more complete understanding of the invention and its advantages will be apparent from the Detailed Description taken in conjunction with the accompanying drawings in which.

DETAILED DESCRIPTION

Figure 1:
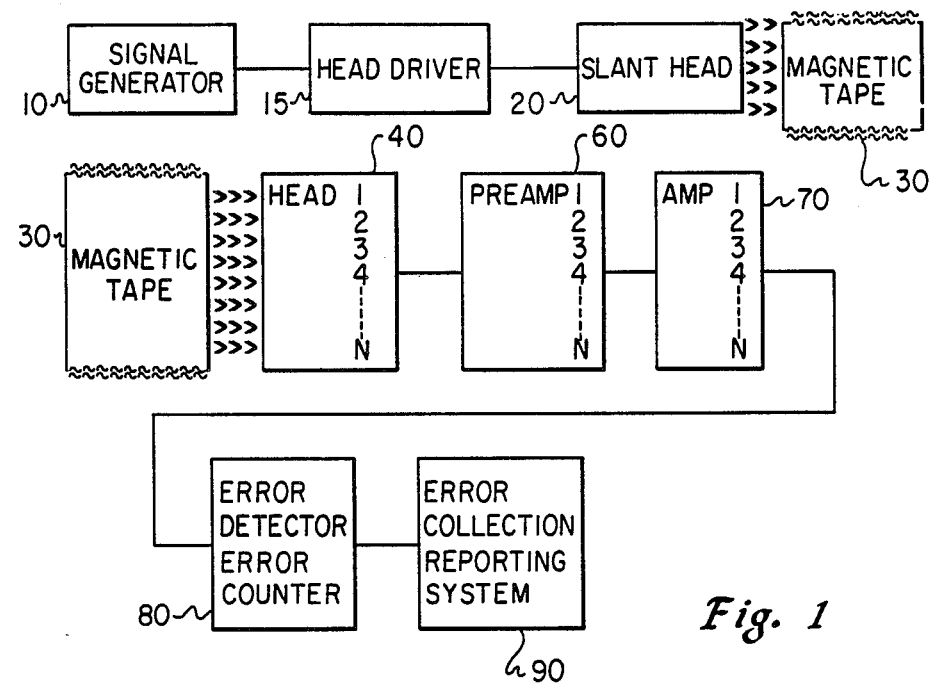
FIG. 1 is a flow chart block diagram of the present invention in (a working configuration.

Referring to FIG. 1, there is shown a flow chart of the components of the slant record/helical scan playback certifier.

In the preferred embodiment of the invention, the signal generator 10 is an oscillator of a design to produce test data. The signal generator 10 is connected to a head driver 15, a conventional amplifier, that provides for proper head current to the slant record head 20. Test data is fixed on the tape 30 by the slant record head 20 in an alternating (1, 0, 1, 0, . . . N) pattern where the north magnetic field is usually logic one and the south magnetic field is usually logic zero.

The signal generator 10 connects via the head driver 15 to the slant record head 20 that records the test data produced by the signal generator 10 on the magnetic tape 30.

In the preferred embodiment of the invention the slant record head 20 is mounted having its gap line 100 (not shown in FIG. 1, but shown in FIG. 3) positioned so the Azimuth of the recording is parallel to the effective gap line 110 (shown in FIG. 3) of the helical scan heads 40. The parallel alignment of the effective gap lines 100 and 110 controls the orientation (Azimuth) of the magnetic field and thus, the recording.

The magnetic tape 30 is then scanned by the helical scan playback heads 40, rotating in a counter-clockwise direction. The helical scan playback heads 40 are mounted in the helical scan assembly 45 that is positioned between the entrance roller guide 50 and exit roller guide 55 of FIG. 2. The roller guides 50 and 55 are mounted at a predetermined height and angle to ensure that the effective gap lines 100 and 110 are parallel.

The helical scan playback heads 40 in one embodiment of the invention reproduce and transmit the recorded test data directly to an error detector and error counter 80. The error detector and error counter 80, subsequently, transmit the error count to an error collection and reporting system 90.

In the preferred embodiment of the invention, each of the helical scan playback heads 40 is connected to a separate preamplifier 60 for initial amplification of the transmitted test data. Each of the preamplifiers 60 connects to a separate amplifier 70, for final amplification of the transmitted test data. Thus, in the Preferred embodiment of the invention the number of scan heads 40, preamplifiers 60 and amplifiers 70 will be the same.

The amplifiers 70 then transmit the amplified signal to the error detector and error counter 80 to detect and count the errors in the transmitted test data by comparing the test data recorded on the magnetic tape 30 by the slant record head 20, with the test data reproduced and transmitted by the helical scan playback heads 40.

Additionally, the error detector 80 usually consists of common industry hardware such as a Bit Sync Phase Lock Loop or a Phase Lock Loop Oscillator and the associated digital circuitry capable of determining when the alternating (1, 0, 1, 0, . . . N) pattern does not alternate evenly and instead has either a continuous string of 1's or 0's.

Further the error detector 80 may consist of a high speed comparator, also common in the industry, capable of detecting predetermined signal drop-outs. The comparator does not detect changes in the alternating pattern, but merely detects when the signal is below a predetermined threshhold level. Any difference in the test data, measured by monitoring the signal drop-out by the helical scan playback head 40, results in bit errors.

The error counter 80 in the preferred embodiment of the invention is a predetermined digital circuitry counter capable of counting the number of errors determined either by an unchanging alternating pattern or as signal drop-outs over a specified period of time.

The error detector and error counter 80 is connected to an error collection and reporting system 90, which collects and reports the errors in a format that allows the determination of the quality of the magnetic tape 30.

In one embodiment of the invention the error collection and reporting system 90 is an IBM PC with a serial interface with the error detector and error counter 80. The IBM PC is used for collecting samples starting at the beginning of the magnetic tape 30 and is used to plot the errors, a histogram of the errors (error size versus number of occurrences) and to print out the errors per length of tape or per a predetermined time interval.

Figure 2:
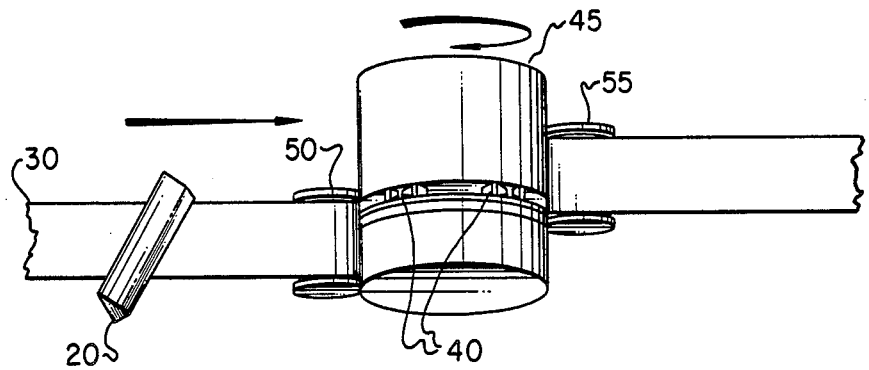
FIG. 2 is an illustration showing the placement of the slant record head and helical scan playback head in relation to each other, as well as the direction of the tape travel.

Referring now to FIG. 2, there is shown an illustration of the invention where the placement of the helical scan playback heads 40, follow the slant record head 20. Further illustrated are the entrance guide 50 and exit guide 55 fixed at a predetermined height and angle to ensure effective scanning of the tape 30. Not shown are the conventional components required to move the tape 30, i.e., capstan motor and servo for speed control, tape reels, reel motors and drivers to control tape spooling and tension, and the scanner motor and servo to rotate the scanner heads 40.

The movement of the magnetic tape 30 is shown by the direction arrows indicating the "read" after "write" performance of the apparatus. Additionally, the effective gap lines 110 of the helical scan playback heads 40 are mounted equidistance around the helical scan assembly 45.

Figure 3:
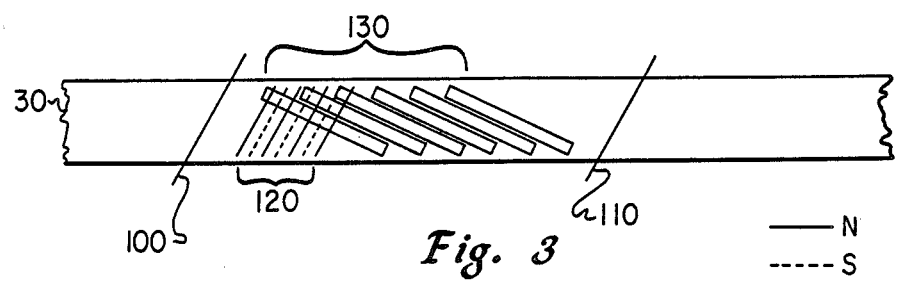
FIG. 3 illustrates the scanned surface of the magnetic tape and the parallel alignment of the slant record head and helical scan playback heads along their respective effective gap lines.

Referring to FIG. 3, there is shown the magnetic tape 30 and the parallel alignment of the slant record head effective gap line (Azimuth) 100 and the helical scan playback heads effective gap lines 110 (Azimuth).

In the preferred embodiment of the invention the longitudinal record head 20 is mounted with its gap line 100 at 90° plus the scan angle to the edge of the tape 30. In order to have a "read" after "write" single pass operation the helical scan playback heads 40 must have their effective gap lines at 90° plus the scan angle to the edge of the tape 30 when rotating. The scan angle is determined by the diameter of the scanner and the positions of the entrance roller guide 50 and exit roller guide 55.

Additionally illustrated are the flux lines 120 (1, 0 reading) on the magnetic tape 30 and the reproduced scanned area 130 of the tape 30. The length of the reproduced scanned area 130 is determined by the width of the record head 20, the width of the reproduced scanned area 130 is determined by the width of the helical scan heads 40 and the angle of the reproduced scanned area 130 is controlled by the diameter of the scanner and the positions of the entrance roller guide 50 and exit roller guide 55. This prevents the need for critical tracking since the entire width of the tape 30 is scanned.

While certain embodiments of the present invention have been described in detail herein and shown in the accompanying drawings, it will be evident that various further modifications are possible without departing from the scope of the invention.

What is claimed is:

1. A slant record/helical scan playback certifier for magnetic tape certification comprising:
   a signal generator producing test data;
   a slant record head connected to said signal generator for recording the test data on magnetic tape;
   a plurality of helical scan playback heads placed downstream of said slant record head for reproducing and transmitting the test data recorded on the magnetic tape; said data recording and playback occurring in a single pass of the record and playback heads;

an error detector and error counter connected to said helical scan playback head for detecting and counting test data errors reproduced from the magnetic tape; and an error collection reporting system connected to the error detector and error counter for collecting and reporting the test data errors reproduced from the magnetic tape.

2. A slant record/helical scan playback certifier in accordance with claim 1, wherein the signal generator comprises an oscillator.

3. A slant record/helical scan playback certifier in accordance with claim 1, wherein said slant record head comprises a longitudinal slant record head with a gap line, said record head mounted at a predetermined angle to the movement of the magnetic tape, for recording the test data produced by the signal generator on the magnetic tape.

4. A slant record/helical scan playback certifier in accordance with claim 1 further comprising:

a plurality of preamplifiers connected to each of said helical scan playback heads for amplification of the test data transmitted by said helical scan playback heads; and a plurality of amplifiers connected to each of said preamplifiers for the additional amplification of the test data transmitted from said helical scan playback head.

5. A slant record/helical scan playback certifier in accordance with claim 1 wherein the magnetic tape is certified at a speed of no less than 60 inches of tape per second.

6. A slant record/helical scan playback certifier for high speed magnetic tape certification comprising:

an oscillator for producing test data;

a longitudinal slant record head with a gap line, mounted in the certifier with said effective record head gap line (Azimuth) parallel to the effective gap lines of the helical scan playback heads, for recording the test data produced by the oscillator on magnetic tape;

a plurality of helical scan playback heads with gap lines, rotating counter-clockwise, mounted in the certifier downstream of said longitudinal slant record head, for reproducing and transmitting the test data recorded on said magnetic tape by said slant record head, said data recording and playback occurring during a single pass of the record and playback heads;

a plurality of preamplifiers connected to each of said helical scan playback heads for the initial amplification of the test data transmitted by said helical scan playback head;

a plurality of amplifiers connected to each of said preamplifiers for the additional amplification of the test data transmitted by said helical scan playback head;

an error detector and error counter connected to said helical scan playback head via the preamplifier and amplifier for detecting and counting errors in the transmitted test data by comparing the test data recorded by said slant record head with the test data reproduced and transmitted by said helical scan playback head; and an error collection reporting system connected to said error detector and error counter for collecting and reporting the errors in a format that allows the determination of the quality of the magnetic tape.

* * * * *